(12) United States Patent
Maetz et al.

(10) Patent No.: US 8,732,819 B2
(45) Date of Patent: May 20, 2014

(54) METHOD AND A DEVICE FOR GENERATING A SECRET VALUE

(75) Inventors: Yves Maetz, Melesse (FR); Marc Eluard, Acigne (FR); Davide Alessio, Rennes (FR); Gilles Desoblin, Saint Michel sur Orge (FR)

(73) Assignee: Thomson Licensing (FR)

(*) Notice: Subject to any disclaimer, the term of this patent is extended or adjusted under 35 U.S.C. 154(b) by 239 days.

(21) Appl. No.: 13/068,357

(22) Filed: May 9, 2011

(65) Prior Publication Data

US 2011/0283353 A1 Nov. 17, 2011

(30) Foreign Application Priority Data

May 11, 2010 (EP) ..................................... 10305497

(51) Int. Cl.
*G06F 7/00* (2006.01)

(52) U.S. Cl.
USPC ............ 726/18; 726/2; 726/6; 726/7; 726/19; 726/27; 725/30; 713/182; 713/183; 713/185; 713/193; 713/202

(58) Field of Classification Search
USPC ............ 726/18, 2, 6, 7, 19, 27; 713/182, 183, 713/185, 193, 202; 723/30
See application file for complete search history.

(56) References Cited

U.S. PATENT DOCUMENTS

| | | | |
|---|---|---|---|
| 5,559,947 A | 9/1996 | Wugofski | |
| 6,718,471 B1* | 4/2004 | Kashima | 726/9 |
| 7,536,556 B2* | 5/2009 | Fedorova et al. | 713/183 |
| 8,117,458 B2* | 2/2012 | Osborn et al. | 713/183 |
| 2004/0010721 A1 | 1/2004 | Kirovski et al. | |
| 2008/0244700 A1* | 10/2008 | Osborn et al. | 726/2 |
| 2009/0172810 A1 | 7/2009 | Won et al. | |
| 2010/0169958 A1* | 7/2010 | Werner et al. | 726/6 |
| 2010/0287382 A1* | 11/2010 | Gyorffy et al. | 713/185 |
| 2010/0306841 A1* | 12/2010 | Wang | 726/19 |
| 2010/0328036 A1* | 12/2010 | Wang | 340/5.85 |
| 2011/0093723 A1* | 4/2011 | Brown et al. | 713/193 |
| 2011/0275050 A1* | 11/2011 | Tucci | 434/362 |
| 2012/0011564 A1* | 1/2012 | Osborn et al. | 726/2 |

OTHER PUBLICATIONS

European Search Report dated Oct. 7, 2010.

* cited by examiner

*Primary Examiner* — Beemnet Dada
*Assistant Examiner* — Sayed Beheshti Shirazi
(74) *Attorney, Agent, or Firm* — Jack Schwartz and Associates, PLLC

(57) ABSTRACT

A device and a method for graphical passwords. A device displays an initial image comprising a plurality of graphical elements, each graphical element having at least two variants; receives user input to select a variant of a number of the graphical elements, thereby generating a modified image; and generates the secret value from at least the selected variants of the graphical elements. The graphical elements are advantageously seamlessly integrated in the images, thereby making the system resistant to shoulder surfing attacks.

15 Claims, 6 Drawing Sheets

METHOD AND A DEVICE FOR GENERATING A SECRET VALUE

This application claims the benefit, under 35 U.S.C. §119 of EP Patent Application 10305497.9, 11 May 2010.

TECHNICAL FIELD

The present invention relates generally to user authentication, and more particularly to graphical passwords.

BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

It is a long established practice to use passwords to protect access to various devices such as for example computers and mobile phones. The most common password system requires a user to use the keyboard to input a character string. A problem with this is that strong passwords—i.e. passwords that are difficult to guess—are often difficult to retain and vice versa.

As it often is easier to remember images than text, a number of solutions have proposed the use of graphical passwords. Moreover, many new devices do not have any physical keyboard. For example Smartphones embed only a touch-screen as input device. In this case, it is required to use a virtual keyboard to enter a textual password. This is not very user friendly, particularly when using strong passwords (alphanumeric mixed upper case and lower case).

In U.S. Pat. No. 5,559,961, Blonder presents a technique in which a user inputs the password by clicking on a sequence of predetermined zones in a predetermined image. US 2004/010721 presents a similar solution.

Passlogix developed this idea according to Suo et al., "Graphical Passwords: A Survey", Department of Computer Science, Georgia State University—http://www.acsac.org/2005/papers/89.pdf. To enter a password, users click on various items in an image in a predefined sequence.

S. Wiedenbeck et al. also extended Blonder's scheme in a number of articles:
- "Authentication Using Graphical Passwords: Basic Results," in Human-Computer Interaction International (HCII 2005). Las Vegas, Nev., 2005
- "Authentication Using Graphical Passwords: Effects of Tolerance and Image Choice," in Symposium on Usable Privacy and Security (SOUPS). Carnegie-Mellon University, Pittsburgh, 2005.
- "PassPoints: Design and Longitudinal Evaluation of a Graphical Password System," International Journal of Human Computer Studies, vol. 63, 2005, pages 102-127.

This system eliminated predefined boundaries and allowed the use of arbitrary images, so that a user can click on anywhere in an image to create a password.

Still according to Suo et al., Passpoint developed a system in which a password is entered by selecting one face among several a plurality of times.

While those systems work reasonably well, they do however suffer from some disadvantages, such as vulnerability to shoulder surfing: an attacker may guess the password by observing the selections/clicks made by the user.

It can therefore be appreciated that there is a need for a solution that overcomes this problem and provides a system that can enable graphical passwords that are resistant to shoulder surfing. The present invention provides such a solution.

SUMMARY OF INVENTION

In a first aspect, the invention is directed to a method of generating a secret value. A device displays an initial image comprising a plurality of graphical elements, each graphical element having at least two variants; iteratively receives user input to select a variant of a number of the graphical elements, thereby generating a modified image; and generates the secret value from at least the selected variants of the graphical elements.

In a first preferred embodiment, the secret value is a password.

In a second preferred embodiment, the device receives user input for the selection of the initial image, which is also used for the generation of the secret value.

In a third preferred embodiment, the graphical images are seamlessly integrated in the initial image and the modified image.

In a fourth preferred embodiment, a user input comprises selection of a graphical element and at least one variant is provided in response thereto.

In a fifth preferred embodiment, the user input to select a variant comprises a simultaneous offer of all the variants of a graphical element to the user.

In a second aspect, the invention is directed to a device for generating a secret value. The device comprises a processor for providing a display with an initial image comprising a plurality of graphical elements, each graphical element having at least two variants; receiving iterative user input to select a variant of a number of the graphical elements, thereby generating a modified image; and generating the secret value from at least the selected variants of the graphical elements.

In a first preferred embodiment, the secret value is a password.

In a second preferred embodiment, the processor is further for receiving a user input for the selection of the initial image, which the processor also uses for the generation of the secret value.

In a third preferred embodiment, the processor is further for seamlessly integrating the variants into the initial image to generate the modified image.

In a fourth preferred embodiment, a user input comprises selection of a graphical element and the processor is further adapted to provide at least one variant in response thereto. It is advantageous that the processor is further adapted to, in response to user input to select a variant, provide all variants of the selected graphical element.

In a fifth preferred embodiment, the processor is further adapted to provide also the graphical element originally displayed.

BRIEF DESCRIPTION OF DRAWINGS

Preferred features of the present invention will now be described, by way of non-limiting example, with reference to the accompanying drawings, in which.

DESCRIPTION OF EMBODIMENTS

A main inventive idea of the present invention is to generate a secret (such as a password) by interacting with an initial image, by modification of one or more graphical elements therein, for example a window, people, vehicles, and a store sign. The graphical elements may be modified by clicking on them and each click can replace the present graphical element by another predefined graphical element that preferably integrates seamlessly in the initial picture. The secret depends on the final picture, which is different from the initial picture and constructed through interaction by the user with the graphical element. As the human brain stores pictures in the long term memory area, the chances of successfully recalling the secret are improved.

Figure 1:
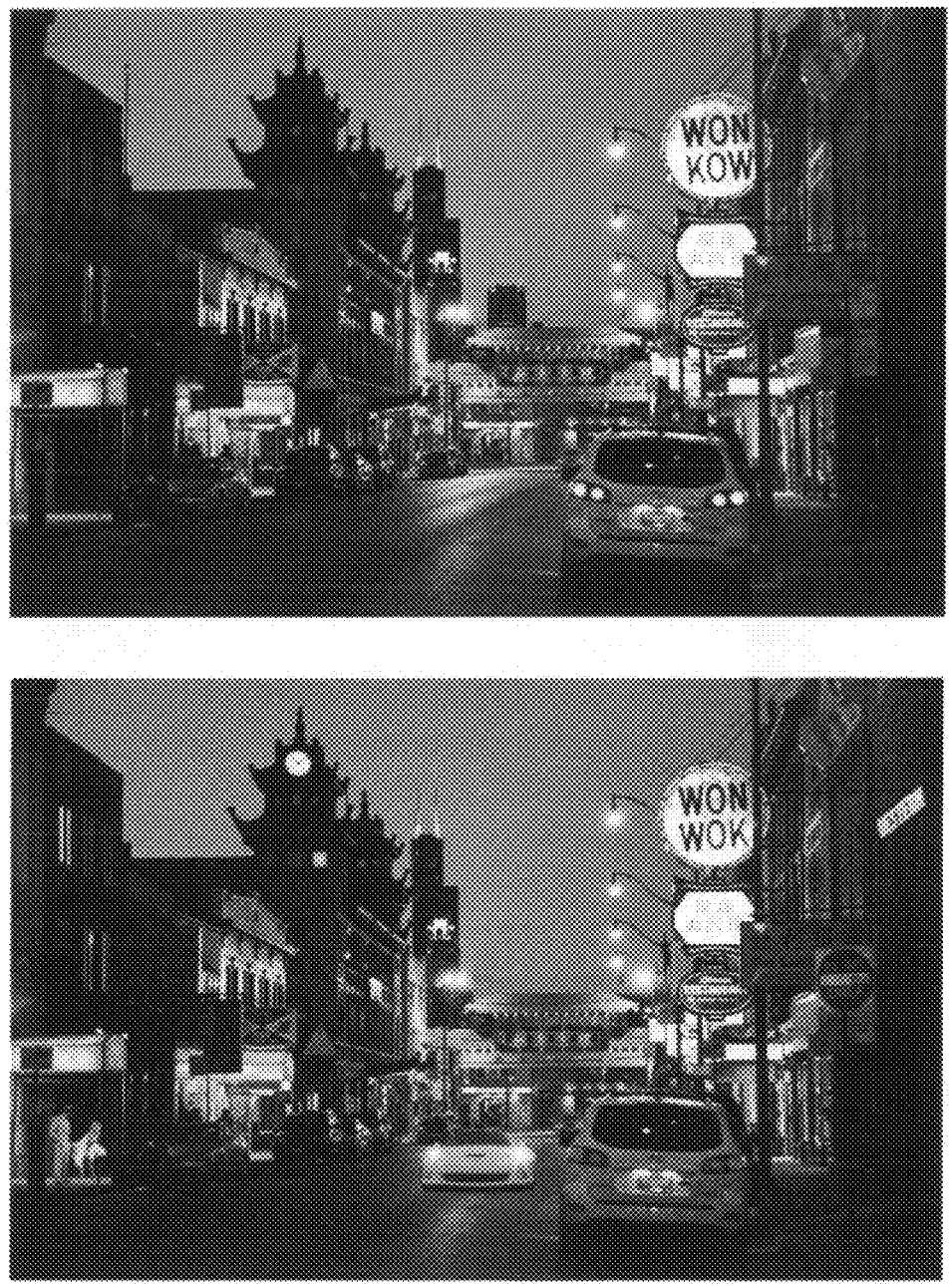
FIG. 1 illustrates an example of how an image may be changed to generate a password.

FIG. 1 illustrates how an image may be changed to generate a password. The upper half of FIG. 1 shows an original image displayed when the user is asked to enter his secret. The user then clicks on several areas of the picture to modify it and the password is derived from the final image shown in the lower half of FIG. 1. As an example, when the user clicks on the empty street (a graphical element), this will show a bus (the next predefined graphical element), clicking again will show a taxi, and so on until the yellow sports car is shown as illustrated in the final image. In all, there are ten other differences between the two versions, differences that are used to generate the password.

All graphical elements are predefined and integrated into the system. As will be appreciated, it is thus quite difficult to notice the differences, in particular if the attacker hasn't seen the image before, which means that a good protection against shoulder surfing attacks is provided, an exception being the use of cameras to record the modifications (and/or final image).

The description herein focuses on the entry of a password, but it will be appreciated that other usages of a secret thus generated are possible in various cryptographic systems (e.g. secret encryption keys) and such usages may need other derivation mechanisms.

Preferred Embodiment

As already mentioned, the preferred embodiment is directed to the entry of a secret applied to the password domain. To simplify, the final picture is considered to be the password.

All graphical elements are predefined and integrated into the system, i.e. it is preferably not possible for an attacker to see what the graphical elements are. In addition, the images are preferably well chosen in order to provide a good variety of modification possibilities. For example, a sunrise on an empty beach would be quite limited whereas a city street offers many different elements to be modified.

Figure 2:
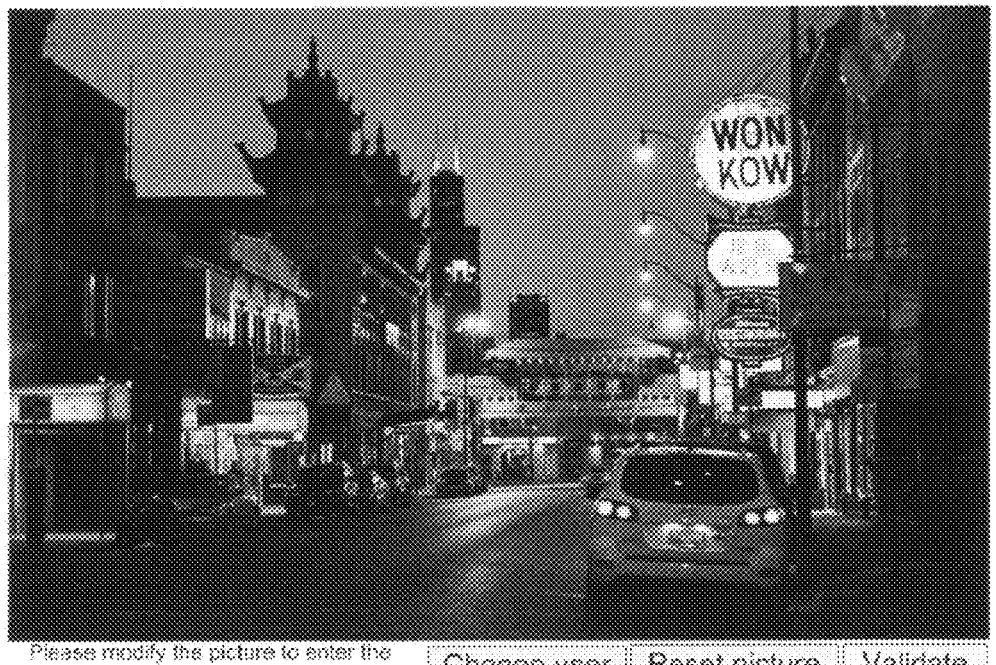
FIG. 2 illustrates an exemplary display for password entry.

FIG. 2 illustrates an exemplary display for password entry. When the user is first asked to enter his password, the display comprises the initial picture, a validation button, a reset button and possibly a button to switch to another user.

Figure 3:
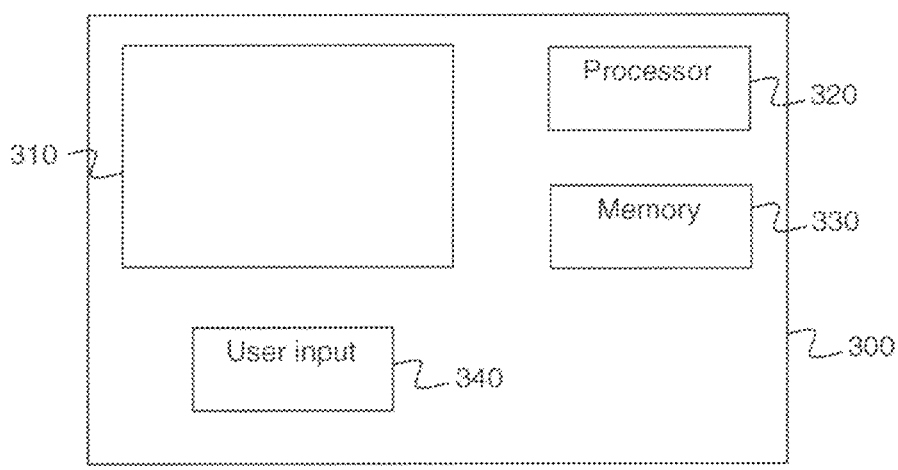
FIG. 3 illustrates a block chart of an apparatus according to a preferred embodiment of the present invention.

FIG. 3 illustrates a block chart of an apparatus according to a preferred embodiment of the present invention. The apparatus 300 comprises a display screen 310 adapted to display the images and displays illustrated in for example FIGS. 1 and 2. The apparatus 300 further comprises at least one processor 320 (hereinafter "processor"), at least one memory 330, and user input means 340. The user input means 340 may be the display screen 310 if it is touch sensitive, but it may for example also be a mouse and/or a keyboard. The processor is adapted to perform the methods of the invention, such as modifying graphical elements upon user requests and generating the password. It will be appreciated that the apparatus 300 may also act as a dumb terminal that relays at least some of the interactions between a user and an external server. It will further be appreciated that the apparatus 300 may be implemented as a plurality of devices, such as for example a display, a user interface, and a computing device that comprises the processor 320 and provides images to the display and receives user input from the user interface.

Figure 4:
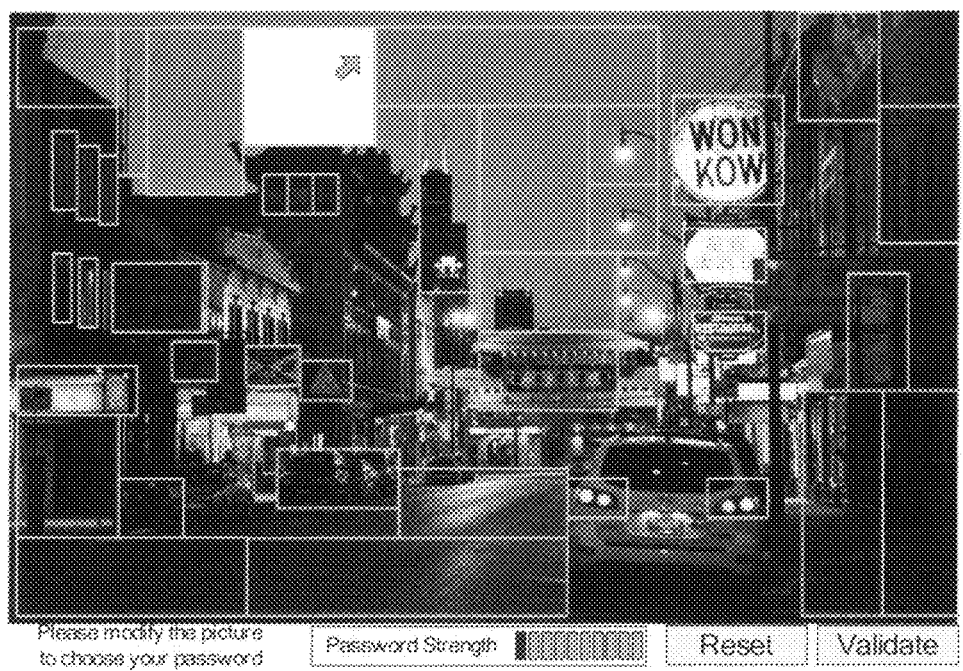
FIG. 4 illustrates examples of different graphical elements of an image.

FIG. 4 illustrates the different graphical elements of the image, each graphical element being depicted as an exemplary rectangle. These graphical elements may also be indicated to the user to facilitate the choice, for example the first time the password is selected. In addition, as shown in FIG. 4, it is possible to highlight the 'present' graphical element.

Figure 5:
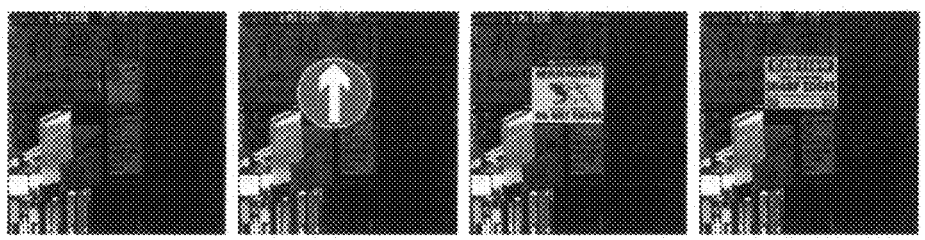
FIG. 5 illustrates how the graphical elements may be changed.

FIG. 5 illustrates how the graphical elements may be changed by clicking on them. Each time the user clicks on the graphical element, the next "version" of the graphical element is shown, replacing the previous one. FIG. 5 illustrates how three successive clicks affects the graphical element around the bus stop sign at the bottom right of the original picture. The order of presenting the graphical elements may either be fixed and predefined or dynamic and random.

When the user has restored the final image by modification of the graphical elements, the validation button is pressed and the password is checked. If the displayed image is indeed the same as the final image, then the password is successfully verified, whereupon for example access is granted.

If the user makes an error during the input of the password, the reset button may be pressed, which restores the initial image and cancels the modifications already done.

Figure 6:
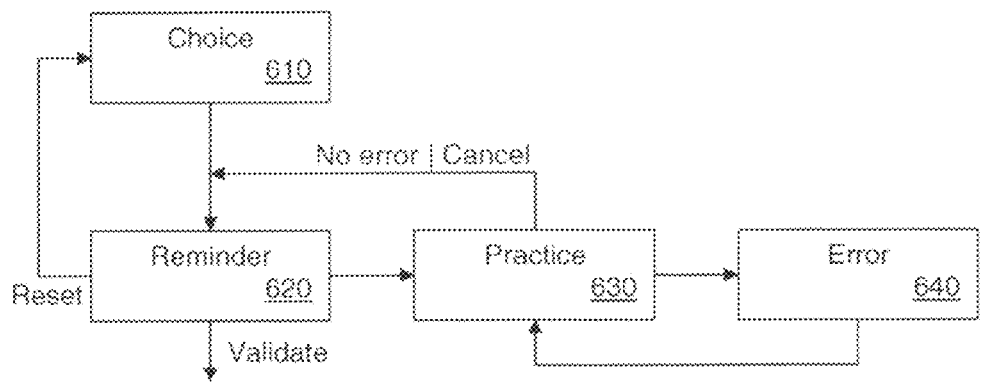
FIG. 6 illustrates the preferred interaction between the enrolment phases.

Enrolment occurs when a new user (without password) creates a password or when an existing user generates a new password. Enrolment advantageously comprises the phases of:

Choice: the user interacts to choose the password
Reminder: the password is displayed to the user
Practice: the user practices the password entry
Error: the user made an error during practice FIG. 6 illustrates the preferred interaction between the enrolment phases.

Enrolment starts with a password choice 610, in which a screen such as the one in FIG. 4 may be displayed, so as to allow the user to identify graphical elements. If the user clicks on the 'present' graphical element (the one that is highlighted in FIG. 4), it is modified, as previously described herein. The display in FIG. 4 also comprises an indicator of the password strength, whose value advantageously depends on the total number of modifiable graphical elements, the number of alternatives for each graphical element, and the number of graphical elements already modified by the user.

If the user makes an error, it is possible to start from the beginning using the "reset" button; as an alternative, an "undo" button can cancel the last action.

When the user is satisfied with the resulting picture, the password may be validated by selecting the "validate" button, after which the reminder phase 620 begins.

Figure 7:
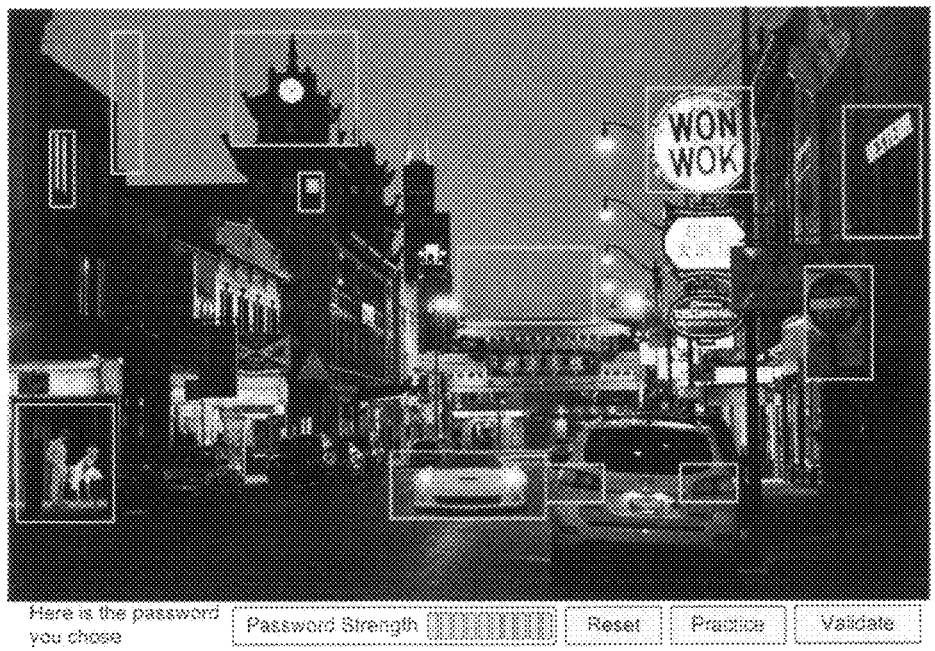
FIG. 7 illustrates an exemplary display during the reminder phase of enrolment.

In the reminder phase 620, the selected image is displayed with the modified graphical elements highlighted, as illustrated in FIG. 7. The user then has the option of validating the password (thereby ending enrolment), resetting the password (to return to the password choice phase 610) or to practice the password. In the latter case, the practice phase 630 begins.

Figure 8:
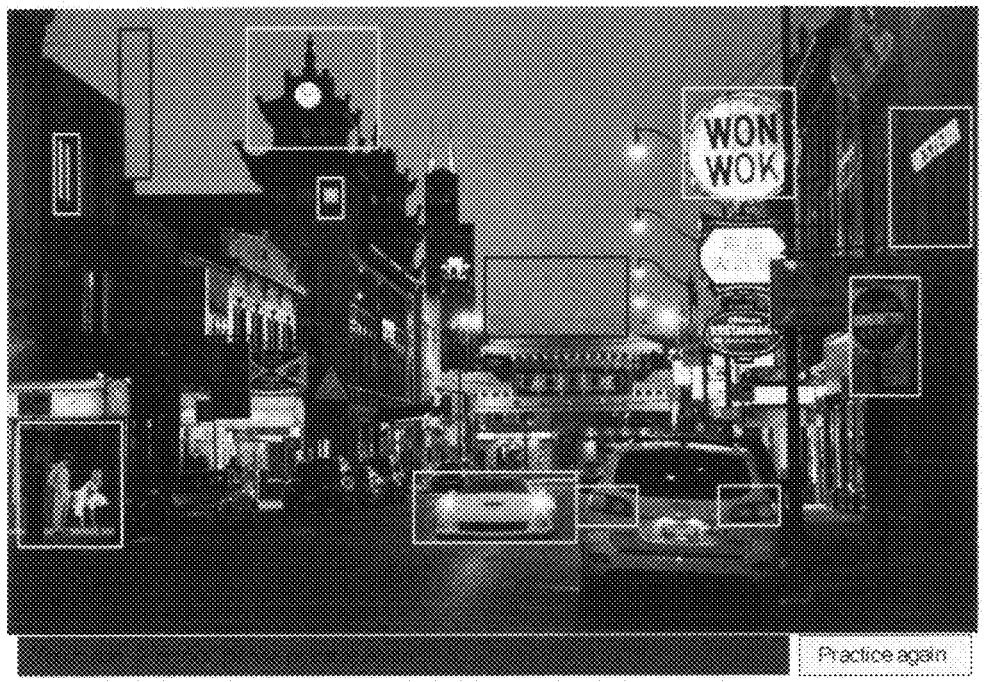
FIG. 8 illustrates an exemplary display during the error phase of enrolment.

In the password practice phase 630, the user may practice inputting the password. The user may cancel the practice to return to the password reminder phase 620 in order to view the selected password. Successful practice also brings about a return to the password reminder phase 620, while unsuccessful practice engenders a move to the error phase 640 in which the errors are shown, as illustrated in FIG. 8, before moving back to password practice 630 for another attempt.

In the error phase 640, it is preferred to indicate correctly selected graphical elements one way and incorrectly selected graphical elements another way.

Password Space

To improve the password space, the order of selection of the graphical elements may be taken into account. In this case, the secret is not derived from the final picture but from the whole interaction that leads from the initial picture to the final picture.

The size of password space may be calculated as follows: an image has e sensible zones (graphical elements) that each has v possible variations. To simplify notations and formulae, it will be assumed that all the zones have the same number of possible variations; this set of variations "symbol alphabet" for a zone is denoted $e_i$. There is also a further state per each zone: the initial (default) state, not counted in the alphabet.

To enter a password, user modifies, in the image, a number n zones, while the remaining e-n zones are left in the default state.

The size $\Omega$ of the password space for a given n, under the hypothesis that the order in which zones are modified does not matter, is provided by the number of n-tuples multiplied by the number of all possible states for the chosen zones, which gives:

$$\Omega = \binom{e}{n} v^n$$

If the input order is also considered, then the size $\Omega$ of the password space for a given n is given by:

$$\Omega = \binom{e}{n} n! \cdot v^n = \frac{e!}{(e-n)!} v^n$$

The size $\Omega$ of the whole password space, summing over n in the interval [0, . . . , e] is, in the first (non-ordered) case, given by $$\Omega = \sum_{n=0}^{e} \binom{e}{n} v^n = (1+v)^e$$

In the second (ordered) case, the size $\Omega$ of the whole password space, summing over n in the interval [0, . . . , e] is given by $$\Omega = \sum_{n=0}^{e} \binom{e}{n} n! \cdot v^n = \sum_{n=0}^{e} \frac{e!}{(e-n)!} v^n = 1 + ev + e(e-1)v^2 + \ldots + e!v^e.$$

It will be appreciated that $\Omega$ in both cases grows exponentially with the number of sensible zones.

The formulae are quite similar to the ones for PIN codes (or classical passwords), a main difference being a new element: the choice of the modified zone. The strength of PIN codes and classical passwords is based on the size and length of the alphabet. A graphical password that has the possibility to choose "where" to modify the password (and where not to) allows more variability for a given size of symbol alphabet and length (number of modified zones). This choice is represented by the binomial coefficient and gives a positive contribution to the password space.

A comparative example with a PIN code will now follow. A 4-digit PIN code has an alphabet of 10 elements (digits) and 4 modifiable zones, giving a total of 10000 possibilities. Using the same numerical parameters in the graphical password context with an image with about 30 modifiable zones gives:

$$\binom{30}{4} \cdot 10^4 = 27405 \cdot 10000 = 274050000$$

possibilities.

Even a simpler image, say with only 8 modifiable zones, provides a remarkable improvement in the password space:

$$\binom{8}{4} \cdot 10^4 = 70 \cdot 10000 = 700000.$$

These numbers can be also larger (by a factor 24) if the order is considered.

In theory graphical passwords are as strong, or stronger, as classical password, as long as an adequate "alphabet" is chosen for the variations. This is easily verified by looking at the asymptotic behaviour of the given formulae. For classical textual passwords, it is very common to use alphanumeric ASCII symbols giving an alphabet size of 62 (lowercase, uppercase and digits). In the graphical password context, alphabet symbols are images or objects and their number is virtually unlimited. On the other hand, for practical use of such a system, the set of variations cannot be as large as in classical case-sensitive passwords.

Comparing the two systems numerically: to obtain a password space of about the same size as an 8-character alphanumeric case sensitive password (common suggestion on websites), it is for example possible to use 12 modified zones with an alphabet of 16 elements; numerically, $62^8 \approx 16^{12}$. It should be noted however, that these numbers do not take into consideration the factor due to the choice of the subset of modified zones among the available zones (say about 30), which provides an advantage for the graphical password. It should also be noted that a system with these parameters could approach the practical limit of this graphical password system, since the representation of 16 (or more) elements on the screen can be confusing but at this level still remains feasible.

As a first variant, the system proposes different initial pictures instead of a single one, thereby giving the user the choice of picture before modifying it to enter the password. Thus the password space may be improved.

Figure 9:
FIG. 9 illustrates a variant embodiment for user input.

As a second variant, all possible graphical elements are displayed when clicked upon. This possibility is illustrated in FIG. 9. The second variant may lead to quicker input (as no more than two clicks are needed to choose the graphical element), but should be noted that it is less resistant to shoulder surfing.

Figure 10:
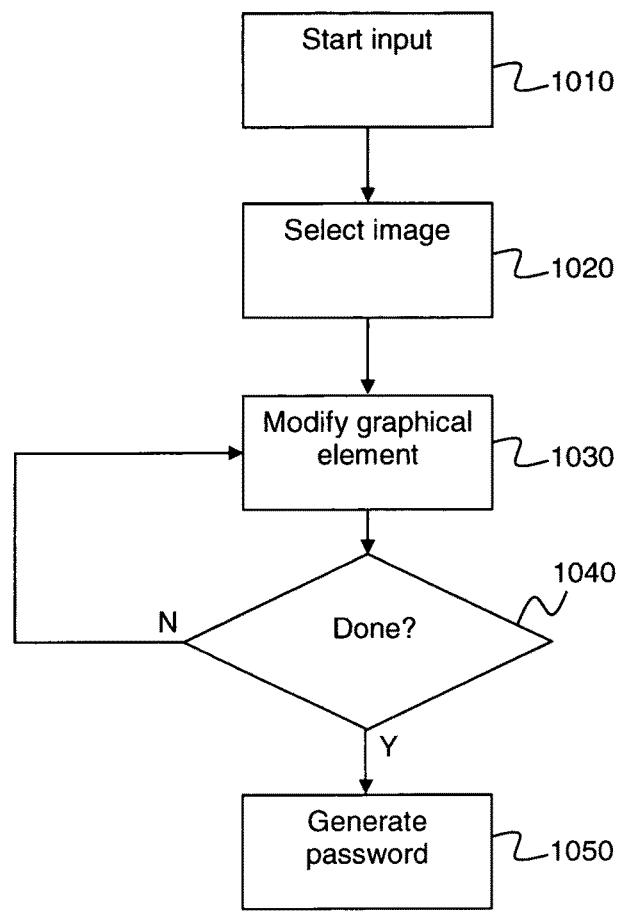
FIG. 10 illustrates a flow chart for a method for generation of a password according to a preferred embodiment of the present invention.

FIG. 10 illustrates a flow chart for a method for generation of a password according to a preferred embodiment of the present invention. The method starts in step 1010, followed by the optional step of selecting 1020 the initial image. The user input is received to modify 1030 a graphical element and the chosen graphical element is displayed to the user. It should be noted that the chosen graphical element is not necessarily the final graphical element chosen by the user; it may in turn be changed. It should also be noted that it is possible that the initially displayed graphical element is displayed after a number of clicks, in which case this graphical element, depending on the implementation, may or may not be considered as a modified graphical element.

It is then verified, step 1040, if the password is complete, for example by checking if the user has validated the password. If this is not the case, the method returns to the modification of a graphical element. However, if the password is complete, then the password is generated 1050. The form of the generated password may for example be a list of the chosen graphical elements, a hash over the (selected or all) graphical elements, or a hash over the entire final image.

It will be appreciated that the present system can enable a graphical password system that:
- can reduce the risk of a dictionary attacks. Indeed, common words represent a large subset in a valid textual password space and are often used to reduce the effort in memorizing passwords. This subset is often well known and shared among people. In the graphical password context, few graphical elements if any are "better" or "more probable" than others.
- can provide a good level of security in a simple and familiar way. It can be used, for example, by old people with sight problems or by children before they learn to read and write.
- can enable the use of longer passwords, as it is relatively easy to associate images and relations among objects in a particular image configuration. Indeed, humans use long-term memory for storing pictures therefore leading to better recall of images compared to text.
- can be used with devices without keyboards on which typing can be difficult.
- can be less sensible to basic click-logging techniques and more resistant to shoulder-surfing.

Each feature disclosed in the description and (where appropriate) the claims and drawings may be provided independently or in any appropriate combination. Reference numerals appearing in the claims are by way of illustration only and shall have no limiting effect on the scope of the claims.

The invention claimed is:

1. A method of generating a secret value, the method comprising the steps at a device of:
    displaying an initial image, the initial image comprising a plurality of individual graphical elements on a display screen, each individual graphical element having at least two variants;
    iteratively receiving user input to select a variant for a number of the plurality of individual graphical elements, thereby generating a modified image including the selected variants for the number of the plurality of individual graphical elements for display on the display screen, wherein each iteration outputs an image reflecting the selected variant, a first iteration takes the initial image as input and each subsequent iteration takes as input the image output by an immediately preceding iteration; and
    generating the secret value from at least the selected variants of the individual graphical elements.

2. The method of claim 1, wherein the secret value is a password.

3. The method of claim 1, further comprising the step of receiving a user input for the selection of the initial image, wherein also the selected initial image is used for the generation of the secret value.

4. The method of claim 1, wherein the individual graphical elements are seamlessly integrated in the initial image and the modified image.

5. The method of claim 1, wherein a user input comprises selection of an individual graphical element and the method further comprises the step of providing at least one variant in response thereto.

6. The method of claim 5, wherein the providing step comprises simultaneously providing all variants of the selected individual graphical element to the user.

7. A device for generating a secret value, the device comprising a processor configured to:
    provide a display with an initial image, the initial image comprising a plurality of individual graphical elements, each individual graphical element having at least two variants;
    receive iterative user input to select a variant for a number of the plurality of individual graphical elements, thereby generating a modified image including the selected variants for the number of the plurality of individual graphical elements, wherein the processor is further configured to output from each iteration an image reflecting the selected variant, to take the initial image as input to a first iteration, and to take as input to each subsequent iteration the image output by an immediately preceding iteration; and
    generate the secret value from at least the selected variants of the individual graphical elements.

8. The device of claim 7, wherein the secret value is a password.

9. The device of claim 7, wherein the processor is further configured to receive a user input for the selection of the initial image, and wherein the processor is configured to use also the selected initial image for the generation of the secret value.

10. The device of claim 7, wherein the processor is further configured to seamlessly integrate the variants into the initial image to generate the modified image.

11. The device of claim 7, wherein a user input comprises selection of an individual graphical element and the processor is further configured to provide at least one variant in response thereto.

12. The device of claim 11, wherein the processor is further configured to, in response to user input to select a variant, provide all variants of the selected individual graphical element.

13. The device of claim 7, wherein the processor is further configured to provide also the individual graphical element originally displayed.

14. The method of claim 1, wherein the user input comprises a click on an individual graphical element of the plurality of graphical elements.

15. The device of claim 7, wherein the user input comprises a click on an individual graphical element of the plurality of graphical elements.

* * * * *